United States Patent
Jonsson et al.

(10) Patent No.: US 6,682,296 B1
(45) Date of Patent: Jan. 27, 2004

(54) TURBINE FOR FLOWING FLUIDS

(75) Inventors: Assar Jonsson, Glommerstrask (SE); Anders Stenlund, Glommerstrask (SE); Tommy Ohlund, Glommerstrask (SE)

(73) Assignee: Water-Wing Power System AB, Glommertrask (SE)

( * ) Notice: Subject to any disclaimer, the term of this patent is extended or adjusted under 35 U.S.C. 154(b) by 0 days.

(21) Appl. No.: 10/111,756

(22) PCT Filed: Sep. 20, 2000

(86) PCT No.: PCT/SE00/01831

§ 371 (c)(1),
(2), (4) Date: Apr. 30, 2002

(87) PCT Pub. No.: WO01/33074

PCT Pub. Date: May 10, 2001

(30) Foreign Application Priority Data

Nov. 1, 1999 (SE) ................................................ 9903951

(51) Int. Cl.[7] .................................................. F03B 3/14
(52) U.S. Cl. .......................... 415/3.1; 415/4.2; 415/4.4; 415/907; 416/24; 416/117
(58) Field of Search .................. 415/3.1, 4.2, 4.4, 415/8, 906, 907; 416/24, 132 B, 117; 290/43, 54

(56) References Cited

U.S. PATENT DOCUMENTS

| | | | | |
|---|---|---|---|---|
| 692,364 A | * | 2/1902 | Russell | 416/117 |
| 1,296,082 A | * | 3/1919 | Huber | 416/117 |
| 1,484,250 A | | 2/1924 | Barnes | |
| 2,419,384 A | * | 4/1947 | Ault | 416/117 |
| 3,810,712 A | | 5/1974 | Hillman | |
| 6,000,907 A | * | 12/1999 | Bic | 416/17 |

FOREIGN PATENT DOCUMENTS

| | | |
|---|---|---|
| GB | 2 051 252 | 1/1981 |
| GB | 2 196 699 | 5/1988 |
| GB | 2 304 826 | 3/1997 |

* cited by examiner

*Primary Examiner*—Ninh H. Nguyen
(74) *Attorney, Agent, or Firm*—Larson & Taylor PLC

(57) ABSTRACT

Turbine for flowing fluid, especially a turbine having a vertical power output shaft and formed with several wings projecting radially out from the power output shaft, which wings are rotatable over an angle of about 90° about horizontal shafts extending closely adjacent and along the trailing edge of the wing as seen in the flow direction, so that the wings, in an operative, first position, are positioned at right angle to the flowing fluid and in a second, non-operative position, are located horizontally or nearly horizontally and on plane with the flowing fluid. Each wing is formed with a fin portion for catching, at a very early stage of an operation cycle, flow medium passing by and to thereby initiate a pressing down of the wing to a portion at right angle to the flow medium for, as far as possible, maintaining the flow medium against the wing during the active moving path thereof.

20 Claims, 3 Drawing Sheets

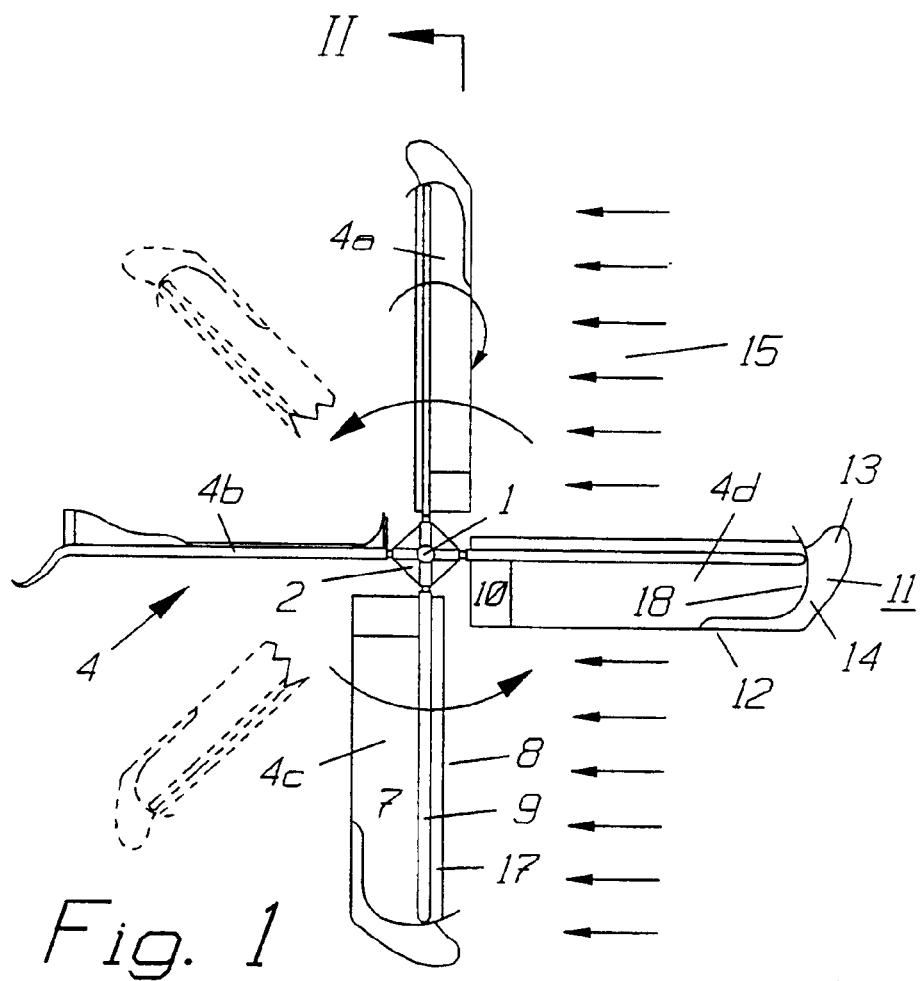
Fig. 1
Fig. 3
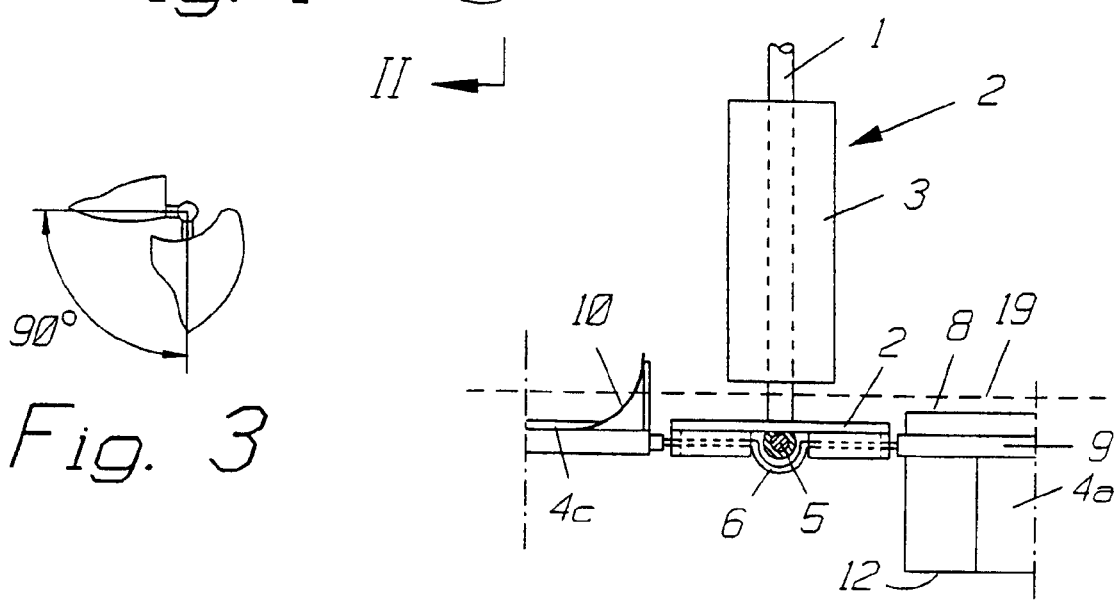
Fig. 2

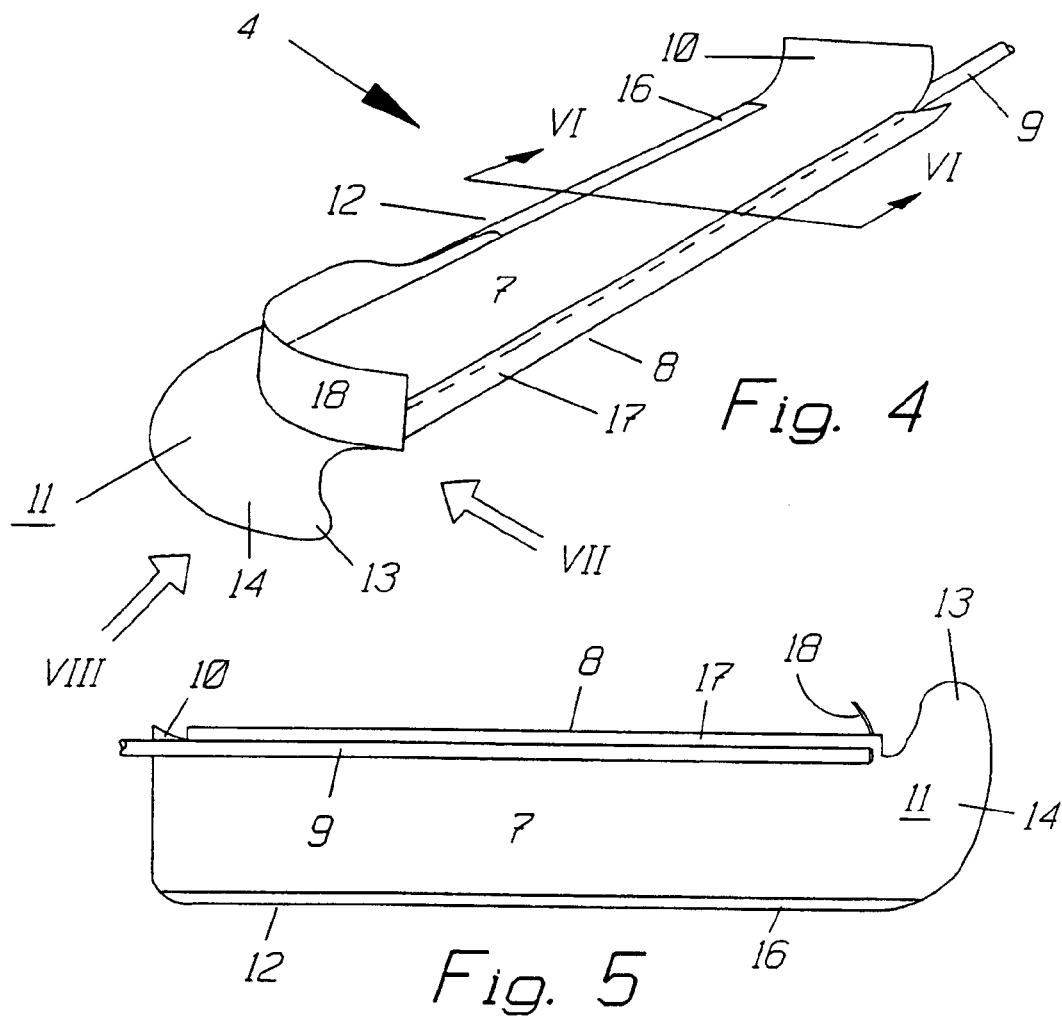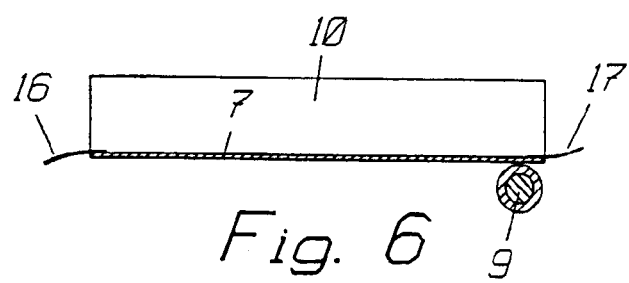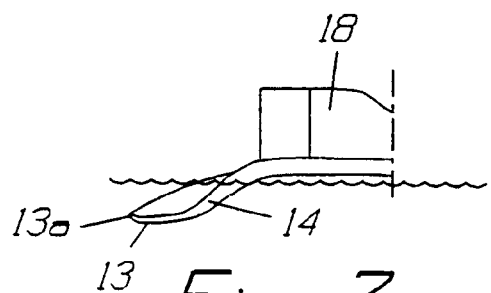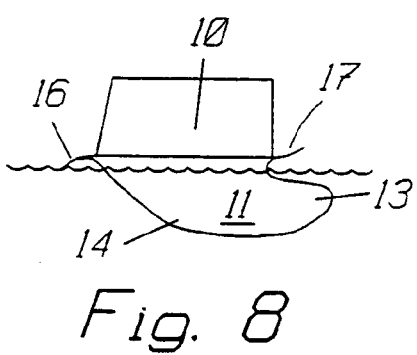

TURBINE FOR FLOWING FLUIDS

TECHNICAL AREA OF THE INVENTION

The present invention generally relates to a turbine for flowing fluids, especially a turbine having a vertical power output shaft and several wings projecting vertically out from said power output shaft, which wings are rotatable over an angle of about 90° about horizontal shafts, so that the wings, in an active first position, are placed at right angle to the flowing fluid and in a non-active second position are placed horizontally or nearly horizontally on plane with the flowing fluid and with the main plane of the wing, in certain applications preferably closely above the flowing fluid, for instance closely above the water level.

PRIOR ART

Turbines of the above-mentioned type are known since long, for instance by the patents U.S. Pat. No. 1,484,250, FR 2.481.754, GB 2.196.699 and FR 2.481.754. Said known structures can be used either as water turbines or as wind turbines, or both. They are all formed with a vertical power output shaft and with flat, rectangular wings which can be rotated over an angle of about 90° for taking up a maximum water flow power, wave power or wing power during a maximum rotation of the power output shaft over 180°, generally, however, only over about 120–160° for the reason that the active part of the turbine wing is not fold down and obtains a maximum received power until at an angle of 10–30° from a zero position, and that the wing, at the end of its active path of movement, receives a successively reduced power, which power in practice is ceased when the power output shaft has rotated about 160–170°.

Said known turbines are of a simple structure and can be used especially at relative low fluid flows in water or air, but they have for many purposes been considered to give a too low efficiency for being profitable, possibly depending on the relatively short effective rotary path of movement.

Turbines of the said type do not require any height of delivery for its operation but can well be used in flowing watercourses like rivers and water streams, or in tide systems, or in any other water flows, even where the flow speed is relatively low.

THE INVENTION

The basis of the invention therefore has been the problem of providing a water turbine or wind turbine, especially suited as a water turbine having the same simple structure as previously known turbines but giving a higher efficiency than has previously been possible to reach and in which the turbine wings are formed so that they both start being seized by the flowing fluid at an earlier stage than has been possible for priorly known turbine wings, and are fold down to a position at right angle or nearly at right angle to the flowing fluid quicker than has been possible for priorly known turbine wings, and also maintains the power from the flowing fluid to a greater extent and for a longer period of time than for priorly known flat, rectangular turbine wings.

SHORT DESCRIPTION OF THE DRAWINGS

Now the invention is to be described more closely with reference to the accompanying drawings, in which FIG. 1 diagrammatically shows a turbine according to the invention seen from above in a horizontal cross section view while operating in a flowing fluid, especially in water.

FIG. 2 is a vertical cross section view along line II—II of FIG. 1, and

FIG. 3 diagrammatically shows the position of the radial outer point of a wing according to the invention in a nonactive and in an active position, respectively.

FIG. 4 is a perspective view obliquely from above of a wing for a turbine according to the invention.

FIG. 5 shows a bottom plan view of the wing of FIG. 4.

FIG. 6 shows a vertical cross section view along line VI—VI through the wing of FIG. 4.

FIG. 7 shows the outer part of the wing following the arrow VII of FIG. 4.

FIG. 8 shows an end view of the wing of FIG. 4 seen along the arrow VIII in FIG. 4.

DETAILED DESCRIPTION OF THE INVENTION

Figure 9:
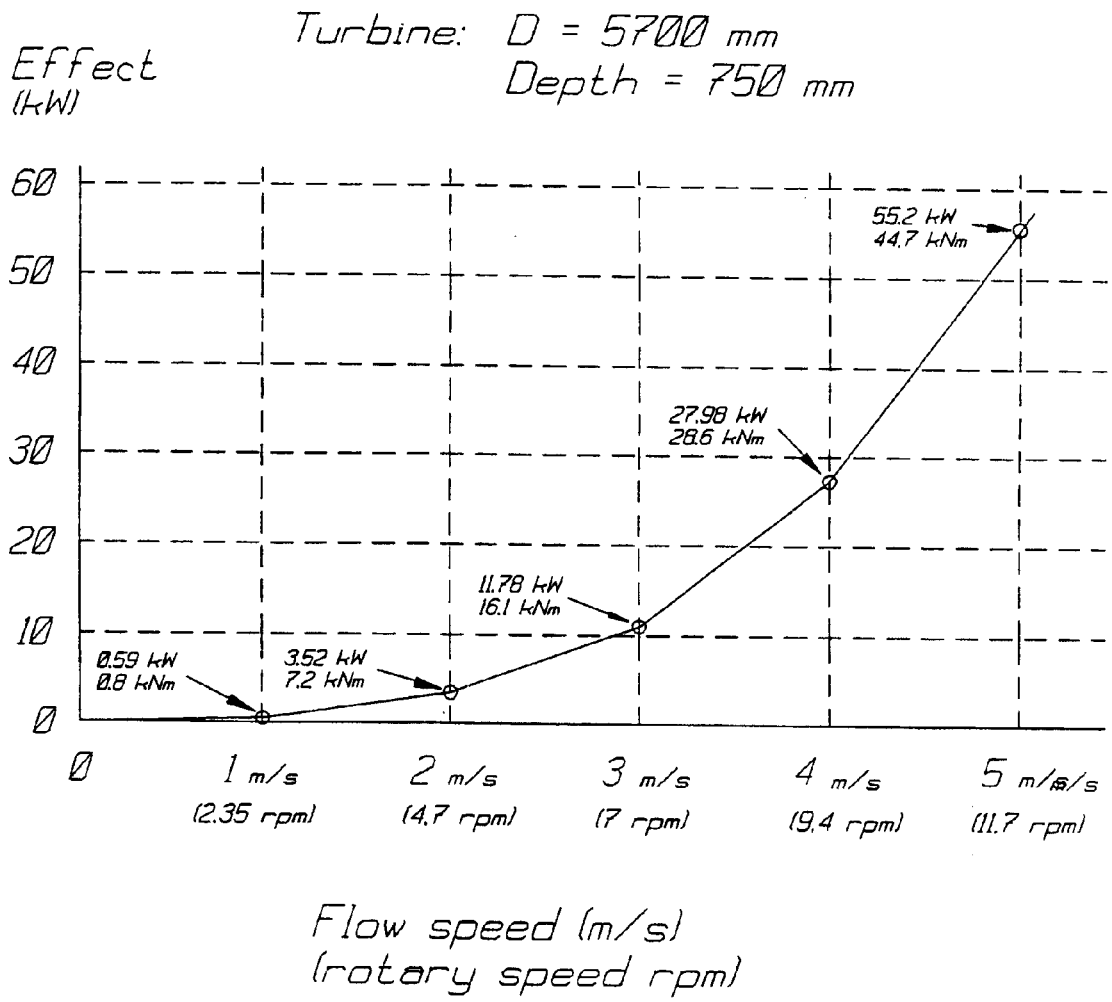
FIG. 9 is a diagram showing the effect of a turbine according to the invention having a certain size, at various flow speeds of the flowing fluid.

The turbine shown in the drawings is of the priorly known type comprising a vertical power output shaft extending from a support platform 2 indicated only diagrammatically, through one or more vertical support bearings 3 to a place where the rotation of the turbine is received, for instance a generator, a mill or whichever other rotary machine. From the platform 2 at the lower part of the turbine several turbine wings 4 project radially outwards. In the embodiment shown in the drawings the turbine is formed with four wings 4 arranged with their axis at right angle to each other. The number of wings, however can be varied as desired and can be more than four wings. In the illustrated case the wings 4 are mounted opposed to each other on each side of the power output shaft 1, and said wings are connected to each other in pairs 4a–4c and 4b–4d, respectively. Said wings which are connected to each other in pairs are mounted rotated 90° in relation to each other so that one wing, for instance wing 4b in FIG. 1, is completely fold down in the flow of water so that said wing takes up any power from the water flow at the same time as the opposite wing 4d is positioned on level with and closely above the water flow level so that it does not provide any water resistance.

One of the pair of wings, for instance 4b–4d, is mounted on a through straight shaft 5 which is blocked up so that it can rotate only 90° corresponding to fully fold down position of one wing 4b and fully fold up position of the other wing 4d, and vice versa. The second pair of wings 4a–4c is correspondingly interconnected over a shaft arc 6 which is bowed underneath the straight shaft 5 and which blocks up the wings in that the arc 6 comes into engagement with a part of the straight shaft 5 or the bearing sleeve thereof which is connected to the support platform 2. The arc 6 can be formed so that the wings can rotate over a complete angle of 90°. During the operation the pair of wings 4a–4c and 4b–4d thereby rotate in a perfectly paddle like movement.

What in essential to the invention is the design of the wings, which design is most clearly shown in FIGS. 4–8. Each wing consists of a flat wing plate 7 which with the bottom side thereof, and along the trailing edge 8 thereof is connected to the horizontal mounting shaft 9. At the inner edge facing the power output shaft 1 the wing plate 7 is bowed upwards in a bow formation thereby forming a type of inner flap 10, and the outer edge of the wing plate 7 is formed with a fin like wing point 11 which in the horizontal plane (see FIG. 5) is curved in a bow rearwardly from the front edge 12 thereby forming a projecting fin portion 13 extending some distance rearwardly of the trailing edge 8 of the wing plate 7, and which in the vertical plane (see FIGS. 4 and 7 and the wing 4b of FIG. 1) is bowed downwards in an S-curved arc 14 and is ended by a point 13a which bowed slightly upwards.

The wing point 11, when located underneath the water level, has for the purpose to catch the water movements and to strive to rotate the wing downwards with main plane thereof into the flow of water 15, straight against the flow direction of the water, as soon as possible after the wing has been rotated to a position for active operation.

For further increasing the ability of the wing to become dipped down into the flow of water the wing plate 7 is, along the front edge thereof, formed with a guide plate 16 which is bowed down for the purpose of introducing the flow of water.

The above mentioned raised portion, or the inner flap 10, has for the purpose to prevent water from flowing off the wing plate 7 in the direction radially inwards, and said raised portion 10 is completed by a raised blocking plate 17 which restricts the possibility of the water to become flushed rearwardly over the wing plate 7. For further improving the operation and keeping the water against the wing plate 7 during the active operation the upper side of the wing is, close to the wing point 11 formed with a bow formed outer flap 18 starting from a position some distance from the outer end of the wing plate 7 and forming an arc which is ended a slight distance behind the raised blocking plate 17.

The function of the apparatus is as follows:

When the apparatus is to be used the turbine apparatus is lowered to a position with the main plane of the wings—in non-operating position—located a slight distance above the water level 19;

whereby the flow of water 15 immediately acts against the wing point 11 which is located dipped down in the water for the wing 4a above its bowed down portion 14, and also under the co-operation of the bowed down guide plate 16 of the wing plate 7, which actuation is accomplished already when the wing is located in the position "East" as shown in FIG. 1, and which actuation is increased to a maximum at the position "North" and is thereafter reduced as far as to the position "West";

the wing 4a is quickly bowed down to a position at right angle to the flow of water, whereby the raised blocking plate 17, the radially inner flap 10 and the outer flap 18 keeps the water against the wing during an extended period of time;

when the wing har rotated 90° to the position "West" the power from the flow of water 15 against the wing is ceased, and when the turbine is further rotated the wing is rotated up about its shaft 9 and then follows with the main plane thereof operation-free during about 180° until it has reached the position "East", whereby a new operation cycle starts.

The said functions occur for each wing 4a, 4b, 4c and 4d of the turbine, independently of the number of wings in the turbine.

Calculations of the effect of the turbine can be made according to the following formula:

Power $(N)=475 \times$ speed $(m/s) \times$ area $(m^2)$

Torque $(Nm)=$ power $\times d$ $(-c-m)$

Effect $(W)=$ torque $\times$ angular velocity

Angular velocity $(rad/s)=6.28/60 \times$ rotary speed (revolutions/min).

A turbine according to the invention having flaps as described above and shown in the drawings surprisingly gives about 50% more effect than what can be calculated according to the above formula.

In other applications the turbine can be mounted with the wings lowered into the water, and depending on the water depth and the desired effect of the turbine several systems of turbine wings can be mounted above each other or aside of each other. At great water depths it is also possible to mount two or more sets of wings on the same shaft straight underneath/above each other. At low water depths it is, on the contrary, possible to mount several systems (sets) of turbine wings on one shaft each aside of each other in a type of cage, where the shafts from each separate turbine system are connected to one common output shaft.

FIG. 9 shows a diagram over the output effect of a turbine having a diameter of the turbine wings of 5700 mm and with the turbine lowered into flowing water having a depth of 750 mm. It is obvious that the output effect is strongly increased with increasing flow velocity of the flowing water, and that an effect as high as 55,2 kw can be obtained at a flow speed of the water of 5 m/s and a corresponding rotary velocity of the turbine shaft of 11.7 rpm.

REFERENCE NUMERALS 1 output shaft
2 support platform
3 support bearing
4 turbine wing
5 shaft
6 shaft arc
7 wing plate
8 trailing edge
9 mounting shaft
10 inner flap
11 wing point
12 front edge
13 fin portion
13a point
14 s-curved arc
15 flow of water
16 guide plate
17 blocking plate
18 outer flap
19 water level

What is claimed is:

1. A turbine for flowing fluids, especially a turbine having a vertical power output shaft and having several wings projecting radially out from the power output shaft, which wings are rotatable over an angle of about 90° about horizontal swinging shafts extending along a trailing edge of the wing as seen in a flow direction of the flowing fluid, so that the wings, in an operative, first position are positioned at right angle to the flow direction of the flowing fluid and in a non-operative, second position are positioned horizontally, or nearly horizontally, characterized in that each wing has a body in the form of a flat wing plate which, at an radial outer end thereof, is formed with a fin like wing point which fin like wing point is bent down so that an outer fin like part thereof is located underneath a main plane of the wing plate for the purpose of catching, at a very early stage of an operation cycle, flowing fluid passing by the outer fin like part and thereby initiating a rotation downwards of the wing to a position at right angle to the flow direction of the flowing fluid, and in that the turbine is arranged to be mounted, in the operative position, with the main plane of the wings closely above the flowing fluid.

2. A turbine according to claim 1, characterized in that the fin like part of the wing point has an outer end thereof which is extended rearwardly to a place behind a trailing edge of the wing plate.

3. A turbine according to claim 1, characterized in that the fin like part of the wing point is formed as an S-shaped bowed down fin as seen in a cross section view in the direction radially out from the wing plate.

4. A turbine according to claim 3, characterized in that the outermost point of the wing fin is slightly bowed upwards.

5. A turbine according to claim 1, characterized in that the wing, at the front edge thereof facing the flow direction, is formed with a bent down guide plate for the flowing fluid extending along the wing plate.

6. A turbine according to claim 1, characterized in that the wing plate is formed with a bent up portion at a radially inner edge thereof which bent up portion acts as an inner flap adapted to keep the flowing fluid against the wing plate.

7. A turbine according to claim 1, characterized in that the wing plate, at the upper side thereof and at its trailing edge, is formed with a bent up blocking plate adapted to reduce the possibility for the flowing fluid to flow past the wing.

8. A turbine according to claim 1, characterized in that the wing plate, at the upper side thereof and close to the outer fin like part, has a bow formed outer flap adapted to keep flow fluid against the wing.

9. A turbine according to claim 1 having four wings extending at right angle to each other, characterized in that the wings are connected to each other in pairs on one and the same shaft with the wings rotated 90° axially in relation to each other, so that one wing in a pair of interconnected wings takes a completely non-operative position when another wing of the same pair of wings takes a fully operative position actuated by the flowing fluid.

10. A turbine for flowing fluids, especially a turbine having a vertical power output shaft and having several wings projecting radially out from the power output shaft, which wings are rotatable over an angle of about 90° about horizontal swinging shafts extending along a trailing edge of the wing as seen in a flow direction of the flowing fluid, so that the wings, in an operative, first position are positioned at right angle to the flow direction of the flowing fluid and in a non-operative, second position are positioned horizontally, or nearly horizontally, characterized in that each wing has a body in the form of a flat wing plate which, at an radial outer end thereof, is formed with a fin like wing point which fin like wing point is bent down so that an outer fin like part thereof is located underneath a main plane of the wing plate for the purpose of catching, at a very early stage of an operation cycle, flowing fluid passing by the outer fin like part and thereby initiating a rotation downwards of the wing to a position at right angle to the flow direction of the flowing fluid, and in that the wing plate is formed with a bent up portion at a radially inner edge thereof which bent up portion acts as an inner flap adapted to keep the flowing fluid against the wing plate.

11. A turbine according to claim 10, characterized in that the fin like part of the wing point has an outer end thereof which is extended rearwardly to a place behind a trailing edge of the wing plate.

12. A turbine according to claim 10, characterized in that the fin like part of the wing point is formed as an S-shaped bowed down fin as seen in a cross section view in the direction radially out from the wing plate.

13. A turbine according to claim 12, characterized in that the outermost point of the wing fin is slightly bowed upwards.

14. A turbine according to claim 10, characterized in that the wing, at the front edge thereof facing the flow direction, is formed with a bent down guide plate for the flowing fluid extending along the wing plate.

15. A turbine according to claim 11, characterized in that the wing plate, at the upper side thereof and at its trailing edge, is formed with a bent up blocking plate adapted to reduce the possibility for the flowing fluid to flow past the wing.

16. A turbine for flowing fluids, especially a turbine having a vertical power output shaft and having several wings projecting radially out from the power output shaft, which wings are rotatable over an angle of about 90° about horizontal swinging shafts extending along a trailing edge of the wing as seen in a flow direction of the flowing fluid, so that the wings, in an operative, first position are positioned at right angle to the flow direction of the flowing fluid and in a nonoperative, second position are positioned horizontally, or nearly horizontally, characterized in that each wing has a body in the form of a flat wing plate which, at an radial outer end thereof, is formed with a fin like wing point which fin like wing point is bent down so that an outer fin like part thereof is located underneath a main plane of the wing plate for the purpose of catching, at a very early stage of an operation cycle, flowing fluid passing by the outer fin like part and thereby initiating a rotation downwards of the wing to a position at right angle to the flow direction of the flowing fluid, and in that the fin like part of the wing point has an outer end thereof which is extended rearwardly to a place behind a trailing edge of the wing plate.

17. A turbine according to claim 16, characterized in that the fin like part of the wing point is formed as an S-shaped bowed down fin as seen in a cross section view in the direction radially out from the wing plate.

18. A turbine according to claim 17, characterized in that the outermost point of the wing fin is slightly bowed upwards.

19. A turbine according to claim 16, characterized in that the wing, at the front edge thereof facing the flow direction, is formed with a bent down guide plate for the flowing fluid extending along the wing plate.

20. A turbine according to claim 16, characterized in that the wing plate, at the upper side thereof and at its trailing edge, is formed with a bent up blocking plate adapted to reduce the possibility for the flowing fluid to flow past the wing.

* * * * *